March 20, 1945. W. F. GROENE ET AL Re. 22,621
LOADING AND UNLOADING OF WORK IN MACHINE TOOLS
Original Filed May 24, 1938 6 Sheets-Sheet 1
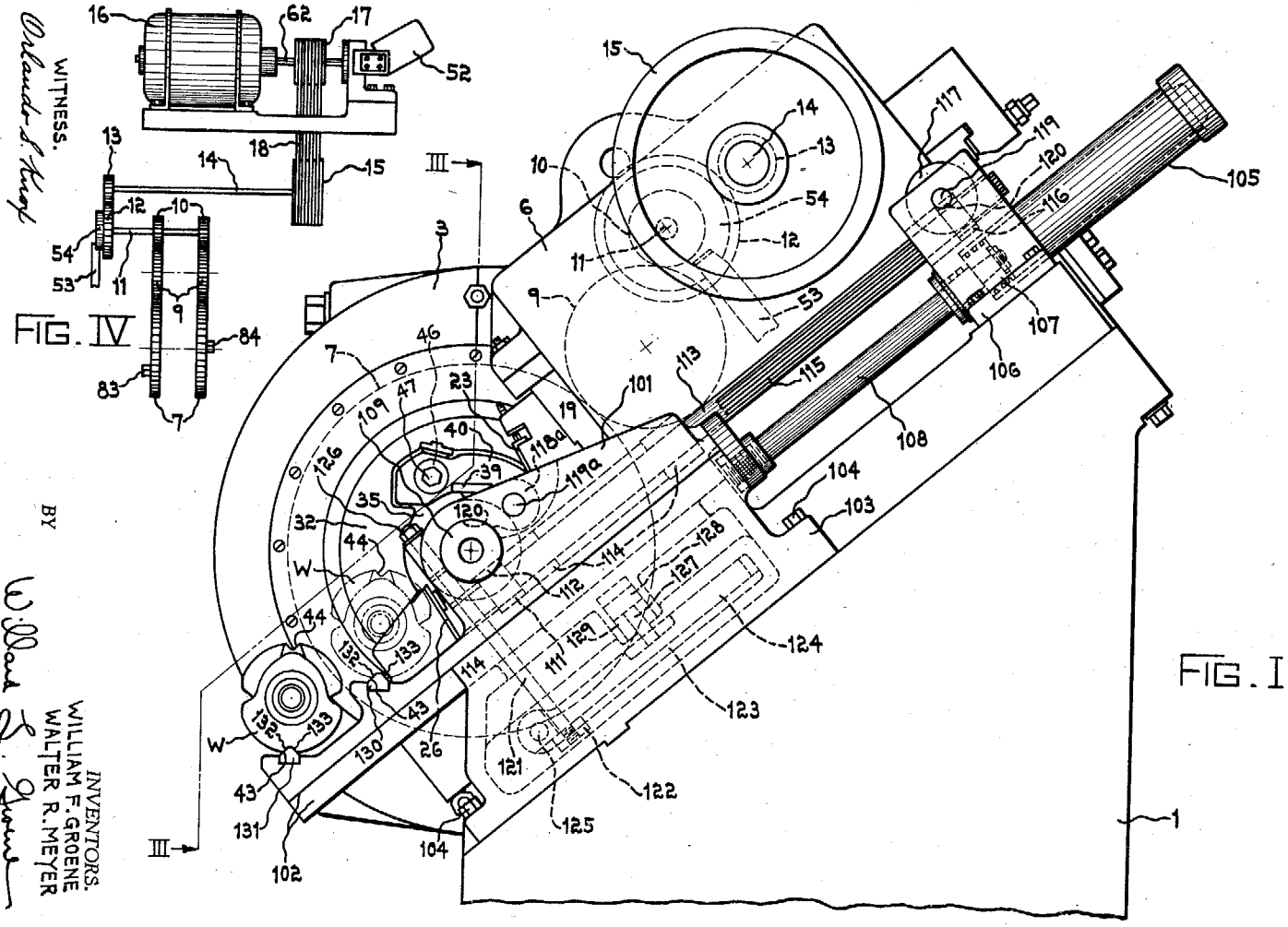
FIG. I
FIG. IV
WITNESS.
Orlando S. Kropf
BY
INVENTORS.
WILLIAM F. GROENE
WALTER R. MEYER
Willard S. Groene
ATTORNEY.

March 20, 1945. W. F. GROENE ET AL Re. 22,621
LOADING AND UNLOADING OF WORK IN MACHINE TOOLS
Original Filed May 24, 1938 6 Sheets-Sheet 2
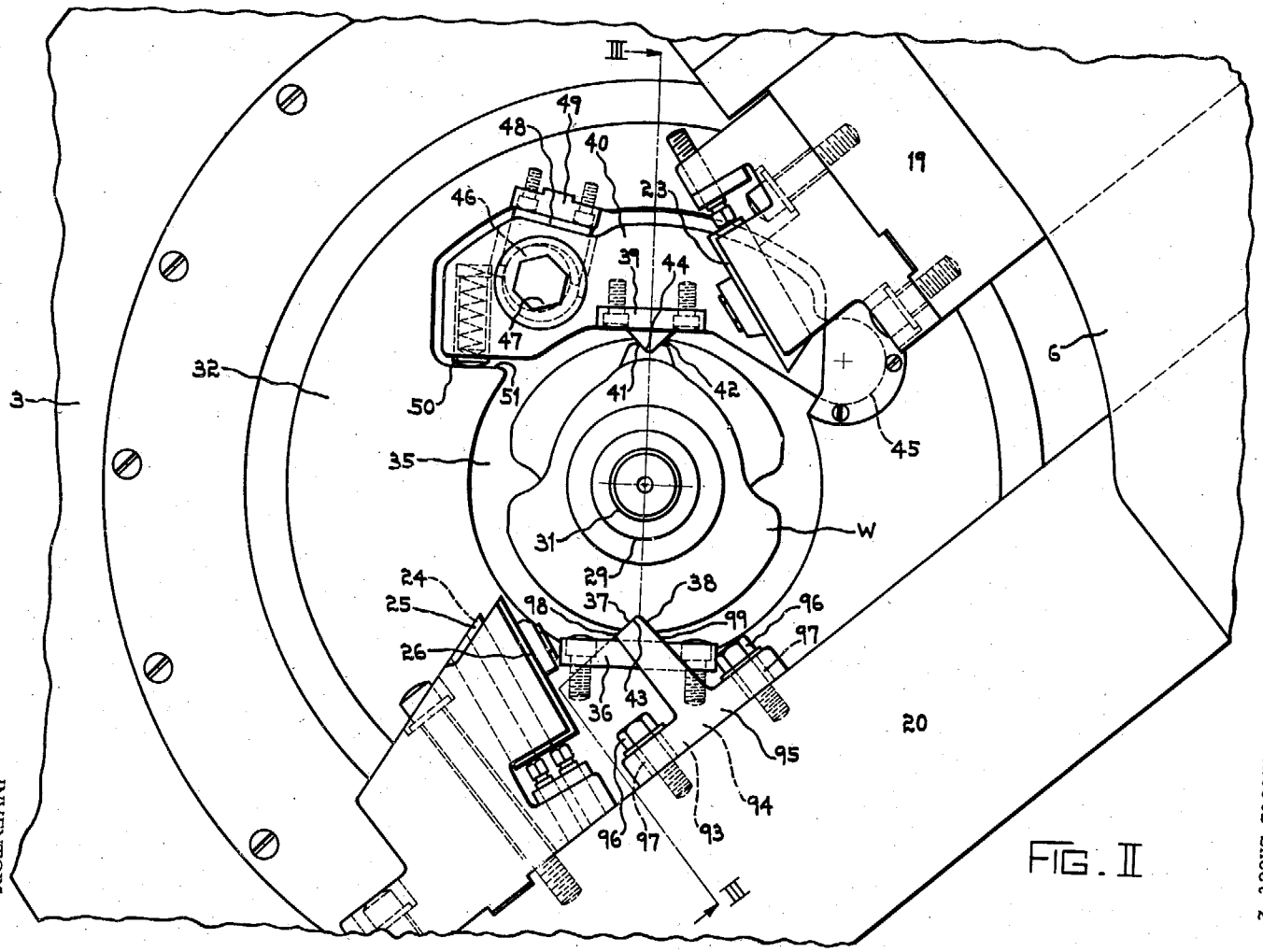
WITNESS.
Orlando S. Knop
BY
INVENTORS.
WILLIAM F. GROENE
WALTER R. MEYER
Willard L. Groene
ATTORNEY.

March 20, 1945. W. F. GROENE ET AL Re. 22,621
LOADING AND UNLOADING OF WORK IN MACHINE TOOLS
Original Filed May 24, 1938 6 Sheets-Sheet 3
FIG. III
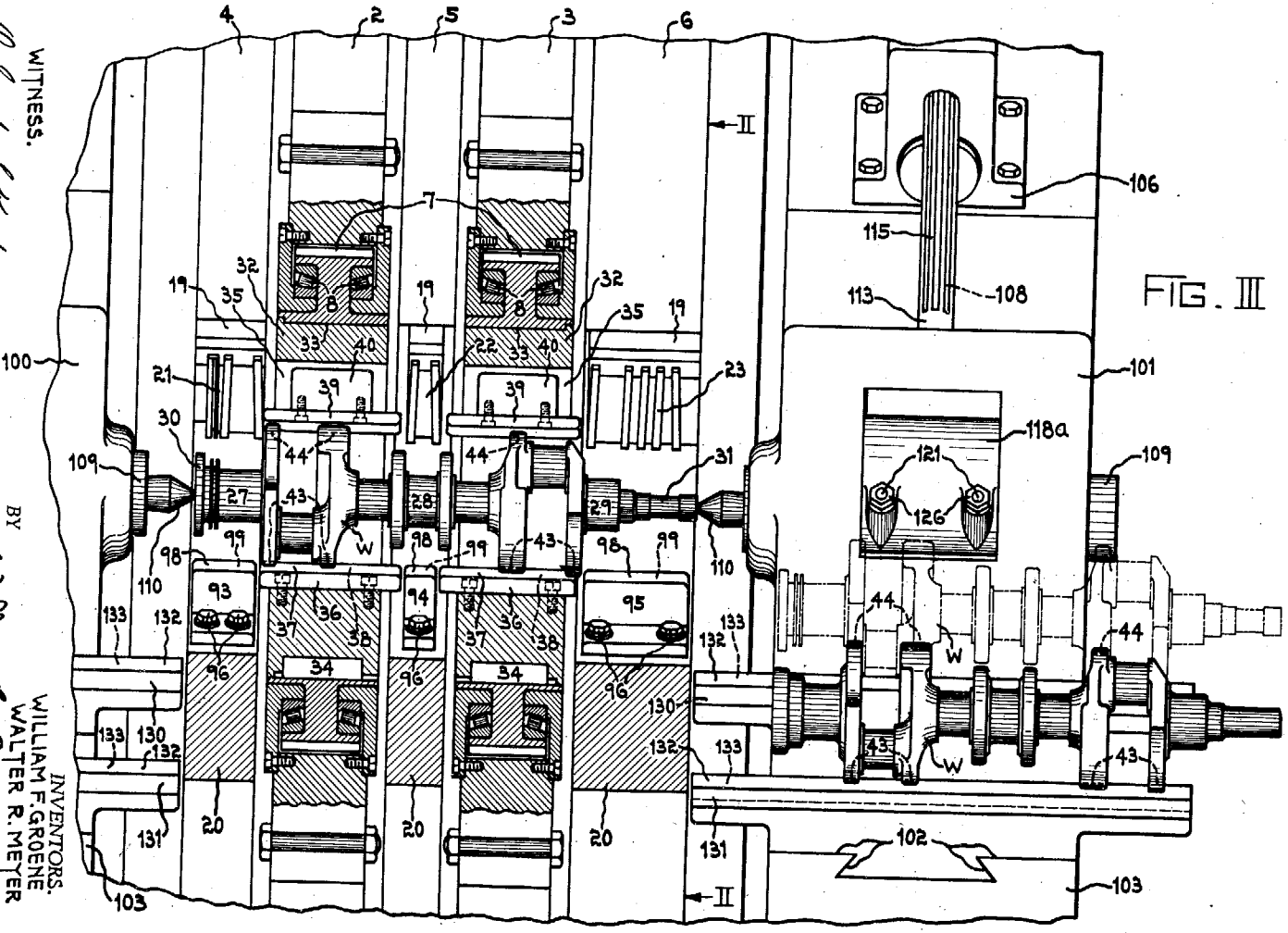
WITNESS.
Orlando S. Kurf
BY
INVENTORS.
WILLIAM F. GROENE
WALTER R. MEYER
Willard S. Groene
ATTORNEY.

March 20, 1945. W. F. GROENE ET AL Re. 22,621
LOADING AND UNLOADING OF WORK IN MACHINE TOOLS
Original Filed May 24, 1938 6 Sheets-Sheet 4
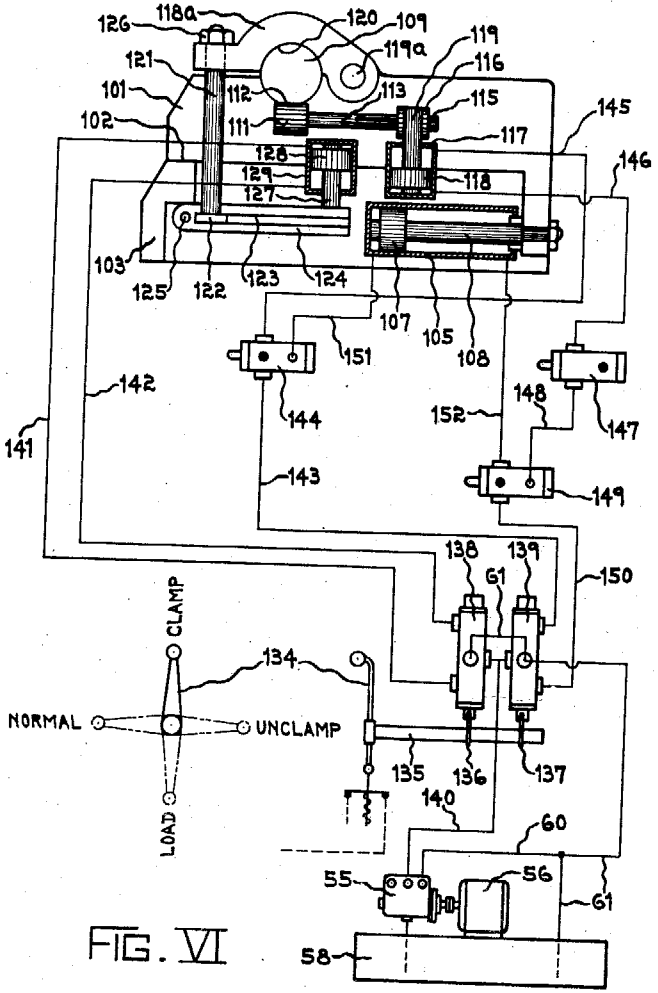
FIG. VI
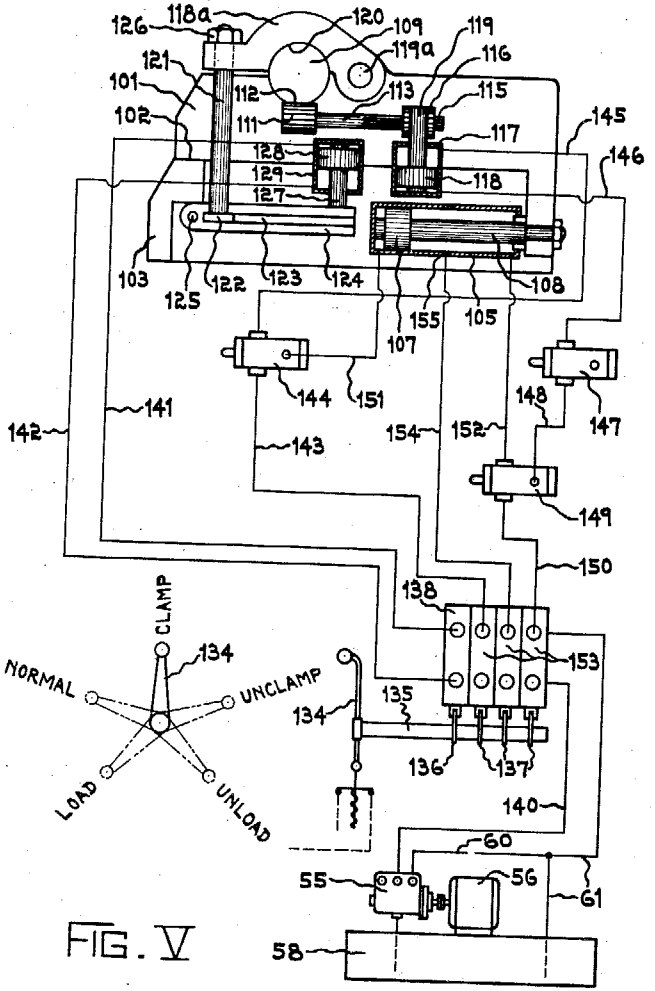
FIG. V
WITNESS.
Orlando S. Knoff
BY
INVENTORS.
WILLIAM F. GROENE
WALTER R. MEYER
Willard S. Groene
ATTORNEY.

March 20, 1945. W. F. GROENE ET AL Re. 22,621
LOADING AND UNLOADING OF WORK IN MACHINE TOOLS
Original Filed May 24, 1938 6 Sheets-Sheet 5
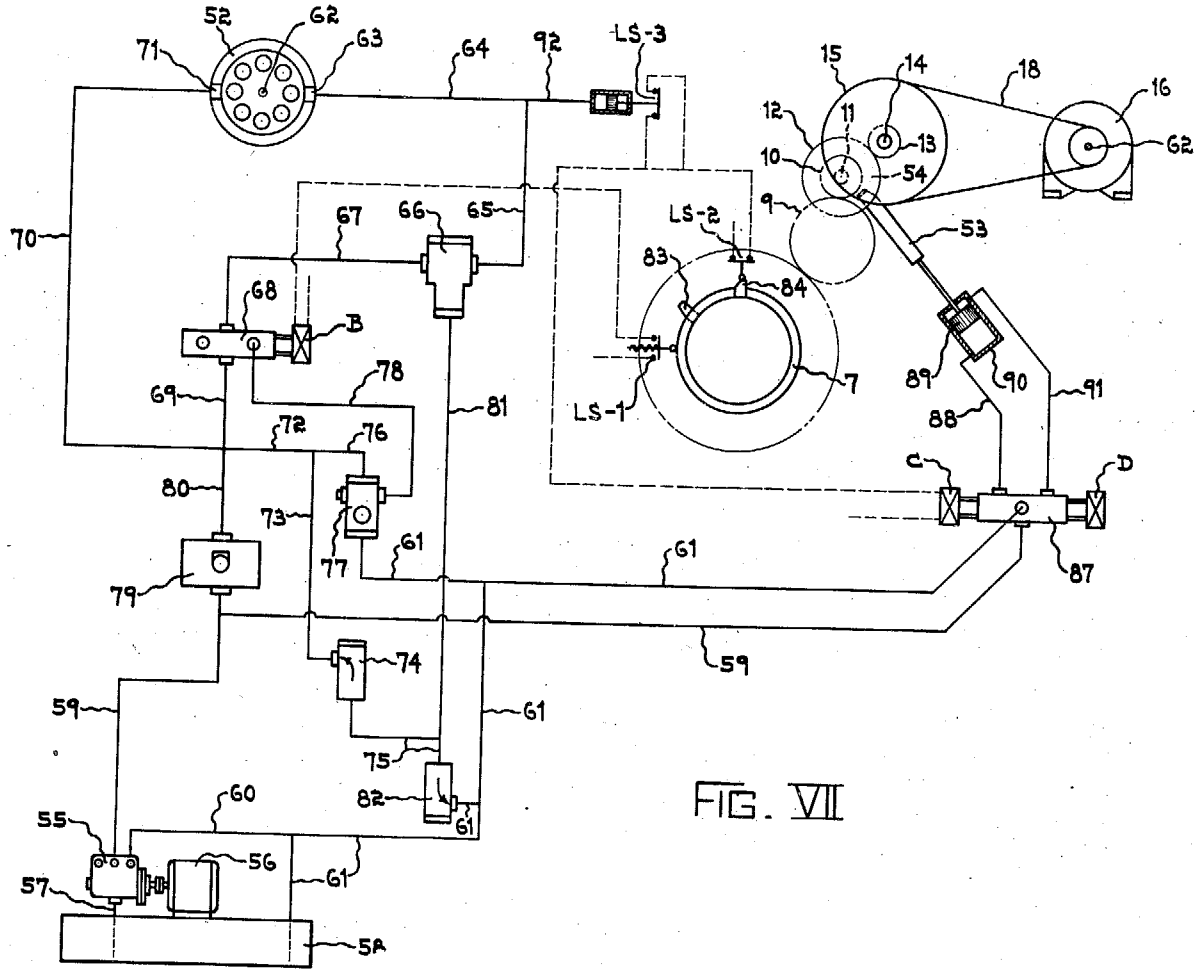
FIG. VII
WITNESS.
Orlando S. Knopf
BY
INVENTORS.
WILLIAM F. GROENE
WALTER R. MEYER
Willard S. Groene
ATTORNEY.

March 20, 1945. W. F. GROENE ET AL Re. 22,621
LOADING AND UNLOADING OF WORK IN MACHINE TOOLS
Original Filed May 24, 1938 6 Sheets-Sheet 6
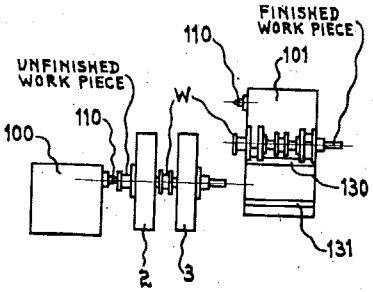
FIG. X
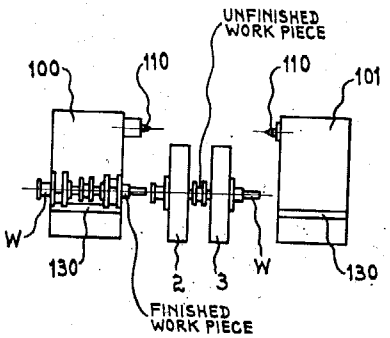
FIG. XII
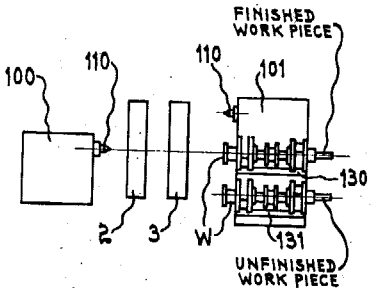
FIG. IX
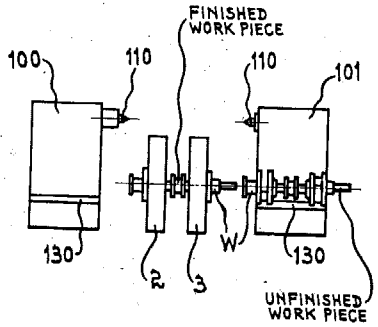
FIG. XI
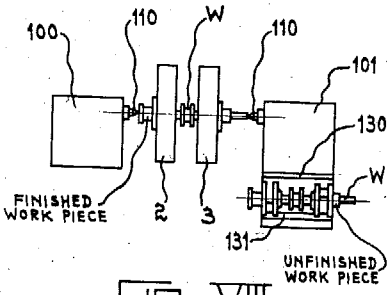
FIG. VIII
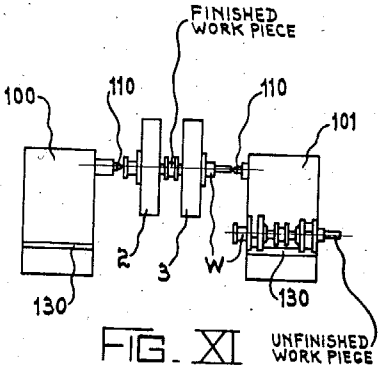
FIG. XI
WITNESS.
Orlando S. Knof
BY
INVENTORS.
WILLIAM F. GROENE
WALTER R. MEYER
Willard S. Brown
ATTORNEY.

Reissued Mar. 20, 1945

Re. 22,621

UNITED STATES PATENT OFFICE 22,621

LOADING AND UNLOADING OF WORK IN MACHINE TOOLS

William F. Groene and Walter R. Meyer, Cincinnati, Ohio, assignors to The R. K. Le Blond Machine Tool Company, Cincinnati, Ohio, a corporation of Delaware Original No. 2,211,722, dated August 13, 1940, Serial No. 209,738, May 24, 1938. Application for reissue September 15, 1941, Serial No. 410,922

35 Claims. (Cl. 82—9)

This invention pertains to loading and unloading of work in machine tools and is particularly related to crankshaft lathes of the center drive type of a character shown in Patent 2,069,107, dated January 26, 1937, in which the crankshaft to be machined is chucked and rotated by means of one or more center drive chucks and has its ends supported by centers while cutting tools operate on the various bearing portions of said crankshaft.

Heretofore in lathes of this character it has always been a major difficulty to provide proper means to load and unload the crankshaft into the center drive chucks. One difficulty has been that caused by the tailstock each side of the center drive chucks which prevented the insertion and removal of the work in the center drive chuck on the axis of rotation of the chuck and crankshaft. In order to avoid moving the tailstocks it was found necessary to make the center drive gears relatively large in diameter, in fact so large as to make the machine difficult to operate as these large center drive gears necessitated large housings which projected outwardly to the front of the machine and interfered with the operator's access to the cutting tools and chucking mechanism in the ring gears. In fact these ring gears became so large in instances where loading devices were used that it was practically impossible for the operator to get at certain of the tools, for example the cutting tools 22 on the tool bar 18, and also difficulty was found in gaining access to the various clamping devices in the ring gear chucks. Another defect of the large ring gears was the difficulty in presenting the tools to the work from such a far removed position when the ring gears were so large as to prevent putting the tool supporting devices sufficiently close to the work piece being machined for proper stability of the tools. This large ring gear construction also presented much greater expense in manufacture, particularly in instances where anti-friction bearings or other highly expensive bearings of large diameter were required. And also in cases where plain bearings were used in conjunction with these large ring gears the surface velocity of the bearing surfaces necessary to properly rotate the crankshaft at cutting speed were so high as to create serious problems of lubrication and wear in the bearings.

Also in the cases where the tailstocks are fixed and relatively large ring gears are utilized it was necessary after moving the crankshaft into the chucking devices to lower it to the chucking members and to raise it again after machining of the crankshaft before it was removed outwardly from the ring gear chuck. This resulted in considerable effort on the part of the operator especially when it was done manually. This also required considerable carefulness of operation on the part of the operator. Where loading devices were used, which loading devices were necessarily of elaborate construction to effect these various movements mechanically, the operator had to carefully actuate them in their proper sequence.

In instances where the tailstocks have been moved in the past the work was invariably loaded manually or by use of the usual cable and hook crane. Such loading and unloading was particularly difficult in instances where more than one center drive chuck was used because of the inability to properly hold the crankshaft when threading it through the chucking devices. The result was that the ring gears had to be made relatively large to permit the crank to be loaded manually without striking the chucking mechanism, and also, the cutting tools had to be withdrawn a relatively great distance from the axis of rotation of the chuck so that they would not be struck by the crankshaft when so loaded. This method obviously was very cumbersome and extremely difficult for the operator to perform consuming considerable time and energy on his part. Another defect of the above method was that there was no accurate way of guiding the crankshaft into and out of the chucking devices independent of the skill and effort exerted on the part of the operator.

In instances where the former type loading devices were used it was found that considerable effort was required on the part of the operator to roll the various loading cranes with the work hanging thereon into and out of the chucking devices commensurate with the high production required of these machines. With the structure here developed, this former effort was substantially reduced to a minimum while at the same time greatly reducing the amount of mental effort and skill necessary on the part of the operator in actuating the former loading devices in a definite sequential manner and in practically eliminating all costly loading devices.

Furthermore with these former methods including the former type loading devices, it was impossible to simultaneously load and unload the crankshafts from the chucks. It was necessary first to remove the finished work piece before a rough work piece was again loaded in the chuck whereas with the present method we are now able to simultaneously eject the completed crankshaft from the center drive chuck while loading an unmachined shaft therein. And furthermore in the former devices particularly where one device is utilized for loading and another for unloading of the work, it was necessary for the operator to move from one side of the machine to the other for operating the respective cranes which, of course, consumed time and effort on the part of the operator and cut down the productive output of the machine.

With these former difficulties clearly in mind, it is therefore an object of our invention to provide means for easily loading and unloading crankshaft in a center drive lathe on the axis of rotation of the center drive chucking devices and to provide means for ejecting said crankshafts from chucking devices with a minimum of effort on the part of the operator.

Another object of our invention is to provide in a center drive lathe chucking devices adapted to engage a crankshaft by means of machined locating notches in its webs and to provide in conjunction with said chucking devices means, associated with the tool bars and tailstocks of said lathe, comprising a substantially continuous rail passing through the center drive chucks and past each of said tailstocks to form a substantially continuous track upon which may be axially slid the crankshafts upon their premachined locating notches for loading into and ejection from said center drive chucking devices.

Another object of our invention is to provide in a center drive lathe, means for supporting and rotating a crankshaft in exact centered and indexed position in the center drive chucks and means for stopping said center drive chucks at the completion of the cutting cycle at a predetermined indexed position relative to a loading and unloading arrangement comprising a rail forming a substantially continuous track from one end of the machine through the center drive chucks to the other end of the machine for loading and unloading crankshafts in said center drive lathe.

Another object of our invention is to provide in a center drive lathe having one or more center drive chucks and tailstock each side of said center drive chucks, means for moving said tailstocks radially of the axis of rotation of said chucks and to provide means on each of said tailstocks comprising a loading and unloading rail, and means for actuating said tailstocks radially for presenting either their centers or the loading and unloading rails in alignment with said chucking devices so that work may be supported at its ends, or may be loaded or unloaded from said chucking devices when the centers of said tailstocks are withdrawn radially from aligned position with the center drive chucks.

It is also an object of our invention to provide in a center drive lathe one or more center drive chucks and associated tailstocks each side of said center drive chucks, both of said tailstocks being movable radially of the axis of rotation of the chucks and each incorporating a loading and unloading rail which may be brought in alignment with said chucking devices when the centers of said tailstocks are withdrawn radially from their work engaging position so that work may be loaded and unloaded from said center drive chucking devices by axially sliding said work with its axis coinciding with the axis of rotation of said chuck.

Another object of this invention is to provide in a center drive lathe a loading arrangement for axially sliding work from one side of the lathe to the other through said center drive chucks while on the axis of rotation of said chucks so that the chucking mechanism will require a minimum of space and a relatively small ring gear and which will require an extremely small amount of movement for clamping and unclamping of the work by means of machined locating areas thereon and to avoid the necessity of moving any clamp or other clamping mechanism other than actuating a single clamping bolt to render the chuck effective or ineffective in gripping the work piece.

Our invention also comprises a novel method of loading and unloading center drive lathes comprising premachining locating notches on the webs of a crankshaft, placing said crankshafts on a loading rail carried on a movable tailstock of said lathe aligned with said center drive chuck, axially sliding said crankshaft from said loading rail past the cutting tools and into said center drive chucks wherein the chucking mechanism engages said crankshaft by means of said locating notches to accurately support and positively rotate said crankshaft in indexed position in the center drive chuck and to provide means for accurately stopping said center drive chuck in a definite predetermined indexed position relative to said loading rail to facilitate loading or unloading said crankshafts axially of said chucking devices.

And it is also an object of our invention to provide means for automatically moving the tailstock of a center drive lathe to present a loading rail in alignment with the center drive chucking devices at the completion of the machining operation and to present its work supporting center in alignment with the chucking devices during the cutting operation.

Further objects and advantages of our invention will appear from the detailed description of the drawings in which:

Figure I is a right hand end elevation of a double center drive crankshaft lathe showing one of the movable tailstocks with loading and unloading rails and the associated center drive chucking device.

Figure II is a vertical transverse section through the lathe of Figure I on the line II—II of Figure III particularly showing the guide blocks on the tool bars and the construction of the center drive chucking devices associated with these blocks.

Figure II is a vertical section substantially on the line III—III of Figure I particularly showing the loading and unloading rails on the tailstocks, the guide blocks on the tool bars and the locating gripping blocks in the center drive chucking devices.

Figure IV is a diagrammatic layout showing the relation of the various parts in the power transmission and driving motor for rotating the center drive ring gears of the lathe.

Figure V is a circuit and operating diagram showing the arrangement used when operating a tailstock with an unloading rail and a loading rail.

Figure VI is a diagrammatic layout of the operating and control mechanism utilized when operating a tailstock having a single loading and unloading rail.

Figure VII is a diagrammatic circuit layout and operating diagram showing mechanism utilized for effecting the accurate indexed stopping of the work spindle in a predetermined position in relation to the loading and unloading rail mechanism.

Figure VIII is a diagrammatic showing of the loading and unloading arrangement provided with one tailstock fixed and one movable, a finished work piece being shown in the chucking devices just at the completion of the machining operation and an unfinished work piece placed on the loading rail of the movable tailstock.

Figure IX is a diagrammatic showing similar to Figure VIII, but showing the movable tailstock positioned for removing finished work pieces from the chucking devices, the finished work piece being shown on the unloading rail and the unfinished work piece shown on the loading rail.

Figure X is a diagrammatic showing similar to Figure VIII showing the movable tailstock positioned for inserting unfinished work pieces into the chucking devices, the unfinished work piece having been just loaded from the loading rail into the chucking devices and the finished work piece on the loading rail ready for removal from the lathe.

Figure XI is a diagrammatic showing of the loading and unloading arrangement provided with both tailstocks movable, a finished work piece being shown in the chucking devices just at the completion of the machining operation and an unfinished work piece placed on the loading rail of the right-hand movable tailstock.

Figure XII is a diagrammatic showing similar to Figure XI, showing the tailstocks moved to loading and unloading position, with the unfinished work piece positioned ready for movement into the chucking devices and for ejecting the finished work piece therefrom.

Figure XIII is a diagrammatic showing similar to Figure XI, showing the position of the work pieces after the unfinished work piece has been inserted in the chucking devices.

The machine comprises a base 1 upon which is mounted the center drive chuck units 2 and 3 and the associated tool units 4, 5, and 6 in a manner as shown in Patent 2,069,107, dated January 26, 1937. In each of the center drive units 2 and 3 are rotatably mounted the center drive ring gears 7 on suitable anti-friction bearings 8 which gears are driven through idler gears 9 rotatably mounted on appropriate bearings in the center drive units by pinions 10 fixed on a drive shaft 11 journaled on appropriate bearings in the center drive units 2 and 3 and in the tool units 4 and 5. The drive shaft 11 projects from the left side of the tool unit 4 and has fixed on this end a gear 12 which is adapted to be driven by a pinion 13 fixed on the pulley shaft 14 which is suitably journaled in the tool units 4, 5, and 6. On the right-hand side of the tool unit 6 is mounted the multiple V-belt driving pulley 15 which is adapted to be driven by a suitable electric motor 16 which has a driving pulley 17 fixed on its shaft and is connected to the pulley by suitable V-belts 18.

In the tool units 4, 5, and 6 are slidably mounted the upper tool bars 19 and the lower tool bars 20. On the upper tool bars 19 are mounted the various cutting tools 21, 22, and 23 and on the lower tool bars 20 are mounted the cutting tools 24, 25, and 26, all of tools being adapted to completely machine all of the line bearing portions 27, 28, and 29 and the flange end 30 and stub end 31 portions of a crankshaft W.

In each of the center drive ring gears 7 is provided chucking mechanism adapted to engage the crankshaft W to serve as the sole means for supporting and rotating said crankshaft in proper position in the lathe. This mechanism comprises a cartridge 32 fixed in the bore 33 of each of the ring gears 7 which is adapted to be positively driven by the key 34 and which has a central bore 35 for receiving the work W. To one side of the axis of rotation of the chuck in the bore 35 is mounted the fixed locating block 36 having accurately machined angularly related locating surfaces 37 and 38 bearing a definite predetermined relationship relative to said axis of rotation of the chuck. Substantially diametrically opposite said loacting block 36 on the other side of said axis is mounted an adjustable locating block 39 fixed in a clamp 40 and having locating areas 41 and 42 similarly related to the chuck axis, when clamped on the work crankshaft W, as the surfaces 37 and 38 of the block 36. The crankshaft W is prepared for chucking in these chucks in the ring gear 7 by having the locating notches 43 which engage the blocks 36 and notches 44 which engage the blocks 39 premachined in a predetermined relation to the axis of rotation of the crankshaft W so that when gripped in said chucks the crankshaft will be positively and securely held in correct centered and indexed position in said devices in a manner as disclosed in the related patents Re. 19,905, dated March 31, 1936; Re. 20,090, dated September 1, 1936; 2,030,020, dated February 4, 1936; and 2,106,501, dated January 25, 1938. A unique arrangement of these locating notches, however, is provided on the crankshaft W in that these notches are so arranged as to permit unlimited axial sliding of the crankshaft along the locating blocks 36 and 39 and other related surfaces to be subsequently described. In order to properly bind the crankshaft between the locating blocks 36 and 39, the clamp 40, which is pivotally mounted in a socket 45 formed in the cartridge 32, is provided with a clamping eccentric 46 which is actuated by placing a wrench in the socket 47 to thereby force the sliding plunger 48 against the abutment block 49 fixed in the cartridge 32 to move the clamp counterclockwise, Figure II, toward the crankshaft W. A spring urged plunger 50 bearing against the surface 51 of the cartridge 32 provides means for automatically raising the clamp 40 from the work when the eccentric is loosened.

When loading and unloading the crankshafts W in the lathe the center drive ring gears 7 are brought to a stop at a definite predetermined indexed position by the hydraulic braking motor 52 attached to the shaft of the main driving motor 16 and the indexing plunger 53 which engages in the indexing disc 54 fixed to the gear 12 in a manner for example as fully disclosed and claimed in co-pending application Serial Number 209,026, filed May 20, 1938. This center drive ring gear stopping and positioning apparatus is best shown in Figures IV and VII. The supply of fluid pressure for this hydraulic control system may be derived from the hydraulic fluid pressure pump 55 driven by an electric motor 56 which draws fluid through the suction line 57 from the fluid reservoir 58 and delivers the fluid under pressure through the pressure line 59. Drainage from a relief valve in the pump 55 for maintaining presture in the line 59 is exhausted through the line 60 into the drain line 61 which returns fluid to the reservoir 58.

In the operation of the lathe when the main drive motor 16 is operating driving the center drive gears 7 during the cutting operation, the hydraulic braking motor 52 is also being driven by the motor shaft 62. Under these conditions fluid is discharged from the exhaust port 63 of the braking motor 52 through the lines 64 and 65, passes freely through the relief valve 66, through the line 67, the solenoid operated control valve 68, which is normally spring set in neutral position at this time, into the line 69, and then through the line 70 back to the intake port 71 of the braking motor to form a closed circuit for free circulation of fluid at large volume when the electric motor 16 is running at full speed offering no resistance to the rotation of the braking motor 52. Fluid from this closed circuit may not escape through lines 72 and 73 because of the check valve 74 which only permits flow of fluid from the line 75 to the line 73. Nor may fluid escape through the line 76 from line 72 since this latter line is at all times closed off at the control valve and serves only to supply fluid pressure for opening the valve 77 to connect line 78 to the drain line 61, which connection is normally cut off by the spring set arrangement in the valve when the pressure drops in the line 76.

High pressure is maintained in the closed circulating circuit by pressure received from the pressure line 59 which passes through the speed control valve 79 which in turn discharges the high pressure fluid into the line 80 connected to said circuit at a definite relatively small volume for at all times maintaining the high pressure in the circuit and to make up for any leakage from said circuit. This discharge from the valve 79 is also utilized to rotate the hydraulic braking motor 52 at a definite slow speed for driving the electric motor 16 and the center drive ring gears 7 at slow speed preparatory to stopping said gears or when jogging them as will be described. The relief valve 66, while it at all times allows free flow between the lines 65 and 67, is so set at a pressure higher than that of the relief valve in the pump 55, or in other words than the pressure in the closed circuit, that fluid does not escape under these conditions through the bypass line 81 and into the drain line 61.

Immediately upon disconnecting the electrical power from the motor 16 the limit switch LS—1 associated with the dog 83 on one of the ring gears 7 becomes effective through the usual relays and contactors (not shown) when engaged by said dog 83 to cause the solenoid B of the control valve 68 to be energized, operating the valve 68 so as to close off the line 69 and to connect line 67 to line 78. This causes the pressure to drop to substantially zero in the lines 70, 72, 73, and 75 because the intake volume through the port 71 of the braking motor 52, which is being driven at a high rate of speed by the momentum of the electric motor 16 and the associated driving transmission for the center drive gears 7, is far in excess of that which can be supplied by the valve 79 through the line 80. Dropping the pressure in the line 76 causes the valve 77 to operate by its spring to close off the line 78 thus preventing fluid from passing through the line 67. Extremely high pressure is momentarily built up in lines 64 and 65 until the momentum in the electric motor and spindle transmission is absorbed by bypassing fluid through the high pressure relief valve 66 into the line 81. The discharge through the line 81 passes through the line 75, through the check valve 74, and into the line 73 due to the suction action set up in the lines 73, 72, and 70 by the rapid intake of the hydraulic braking motor 52. The check valve 82, which is arranged to prevent flow from the drain line 61 to line 75, maintains the suction action through the check valve 74.

The hydraulic braking motor 52 will continue to decelerate in bypassing fluid through the valve 66 until it has slowed down to a point where the volume taken into the intake port 71 is equal to that being supplied through the line 80 from the valve 79. The valve 66 is so set as to effect the deceleration to this point by the time the work spindle has made about a half revolution of the work spindle or ring gears 7. After the hydraulic braking motor 52 has decelerated to the above point pressure again builds up in the lines 70, 72, 73, and 76 and the braking motor 52 is driven at a relatively slow speed for similarly rotating the work spindle by fluid from the line 80. Building up pressure in the line 76 again opens the valve 77 connecting line 78 to the drain line 61, allowing free flow of fluid through line 67 thus eliminating all back pressure at the exhaust port 63 of the braking motor 52 which would hinder the operation of said motor 52 at the predetermined slow speed.

As soon as the limit switch LS—1 is operated the limit switch LS—2 is then rendered in a condition to be effective when operated. The limit switch LS—2 is operated when the dog 84 carried on one of the ring gears 7 engages it as the work spindle is rotated at the predetermined slow speed by the hydraulic braking motor 52. Operation of the limit switch LS—2, through appropriate relays and contactors (not shown), causes the solenoid C of the control valve 87 to be energized to operate the valve 87 so as to connect the fluid pressure line 59 to the line 88 to cause the indexing plunger 53 connected to the piston 89 in the cylinder 90 to be urged against the indexing disc 54. Exhaust fluid from the cylinder 50 under these conditions passes through line 91, the valve 87, and into the drain line 22. The dog 84 is arranged to operate the limit switch LS—2 just prior to the time when the notch in the indexing disc 54 is in position for engagement by the indexing plunger 53. Thus the plunger 53 bears against the periphery of the indexing disc after limit switch LS—2 has operated, the plunger jumping into the slot as the spindle transmission is rotated at slow speed by the braking motor 52 to instantly arrest rotation of the ring gears 7 and stop them in accurate predetermined indexed position.

The solenoid D of the valve 87 is adapted to be energized to connect the pressure line 59 to the line 91 and line 88 to the drain line 61 for withdrawing the indexing plunger 53 from the indexing disc 54 whenever the main driving motor 16 is energized. In order to prevent damage to the machine in the event the indexing plunger 53 would be inserted in the disc 54 before the spindle transmission had completely decelerated to the slow speed, a pressure controlled limit switch LS—3 is connected in series with the limit switch LS—2 and is operated by pressure in the lines 64 and 65 through its connecting line 92 so as to render the limit switch LS—2 inoperative so long as there is pressure in the lines 64 and 65 during deceleration of the lathe transmission, the pressure dropping to substantially zero in these lines to allow the limit switch LS—3 and LS—2 to operate only when the braking motor 52 has completely decelerated and is being driven at the predetermined slow speed from the hydraulic pump 55 as described.

On each of the tool bars 20 are mounted the T-shaped guide blocks 93, 94, and 95 by suitable bolts 96 passing through clearance holes 97 in said blocks and threaded in the tool bars. These blocks have guide surfaces 98 and 99 on their upper ends which are arranged to be in alignment with the respective surfaces 37 and 38 of the fixed locating blocks 36 in the ring gears 7 when the ring gears are stopped in indexed position and the tool bars 19 and 20 are in fully retracted position. Any variation of the retracted position of the tool bars 20 in setting the cutting tools 24, 25, and 26 for properly sizing the work may be compensated for by loosening the bolts 96 and moving the blocks 93, 94, and 95 on the tool bar 20 to bring their surfaces 98 and 99 in proper alignment with the blocks 36 in the center drive chucks.

On the base 1 of the lathe each side of the center drive chuck units and tool units are mounted the automatically operated tailstocks 100 and 101. Since the construction and operation of these tailstocks is substantially alike, a description of the one tailstock 101 will suffice for both. Noting particularly Figures I and III, the tailstock 101 is slidably mounted on dovetail guideways 102 on the support 103 fixed on the base 1 by bolts 104 for movement perpendicular to the axis of rotation of the center drive ring gears 7. A hydraulic cylinder 105 mounted in a bracket 106 fixed to the base 1 having its piston 107 and associated piston rod 108 connected to the tailstock 101 serves to reciprocate the tailstock 101 on the dovetail guideways 102. Mounted in the tailstock 101 is the tailstock barrel 109 having the usual center 110 adapted to move parallel with the axis of rotation of the center drive gear 7. This barrel 109 is axially reciprocated by a pinion 111 engaging a rack 112 formed on the barrel and fixed on a rock shaft 113 journaled against axial movement in appropriate bearings 114 in the tailstock 101. The outwardly projecting portion of the rock shaft 113 has splines 115 which slidingly engage in the splined bore of the pinion 116 journaled against axial movement in the bracket 106. Mounted on the bracket 106 is a hydraulic cylinder 117 having a piston 118 and an associated piston rod 119 having rack teeth formed thereon engaging the pinion 116 whereby fluid pressure actuation of the cylinder 117 effects movement of the tailstock barrel 109. In connection with this barrel 109 is a clamp 118a for locking the barrel in position when its center 110 is engaged with the end of the crankshaft W. This clamp 118a is pivotally mounted on a pin 119a fixed in the tailstock and extends over the barrel 109 with an arcuate bearing surface 120 slidingly engaging said barrel when unclamped. To the opposite side of the barrel 109 from the pin 119a are attached the tension bolts 121 which have squared heads 122 slidingly engaging appropriate slots 123 in the clamping plate 124 (for movement with the tailstock 101) pivotally mounted on a pin 125 fixed in the support 103. Adjusting nuts 126 on the bolts 121 provide means for properly adjusting the clamping force of the clamp 118a against the barrel 109. A hydraulically actuated plunger 127 connected to the piston 128 in the cylinder 129 formed in the support 103 serves to actuate the clamp plate 124 and the bolts 121 to effect clamping of the tailstock barrel by the clamp 118a.

Mounted on the tailstock 101 and movable therewith are loading and unloading rails 130 and 131 having the angularly related surfaces 132 and 133 adapted to receive the mating surfaces of the notches 43 of the crankshaft W. By moving the tailstock by appropriately actuating the cylinder 105 as will be described, the tailstock barrel and its center may be positioned coaxial with or removed from the axis of said center drive chucks and one or the other of the rails 130 and 131 may be positioned so as to be in alignment with the fixed locating blocks 36 in the chucks and the blocks 93, 94, and 95 on the tool bars 20 when the chucks are stopped in indexed position. When so positioned either of the rails 130 or 131 and the blocks in the chucks and on the tool bars form a substantially continuous track from the tailstocks past the cutting tools and through the center drive chucks upon which work crankshafts W may be slid axially into and out of loading position in the chucking devices of the lathe. To load a crankshaft W in the lathe it is merely necessary to place the crankshaft with its notches 43 in engagement with one of the properly positioned rails 130 or 131 and push the crankshaft axially into the center drive chucks and tighten the clamping eccentrics 46, no other manipulations being necessary before starting the cutting operation. At the completion of the cutting operation the clamping eccentrics 46 are loosened and the crankshaft W slid axially out on one of the properly aligned rails 130 or 131.

The notches 43 and 44 to be prepared on the work piece W must be of such limited size and so positioned as to have substantially no effect on the ultimate balance and necessary configuration of the crankshaft. But these notches must be of sufficient size and so positioned on the work to properly maintain it on the rails and blocks unassisted by the operator in loading and unloading the work in the lathe. A surprising thing has been discovered by the applicants in developing this loading and unloading arrangement in that it is found that much less effort is required to slide the crankshaft W into and out of the center drive chucks on these notches than is required to similarly manipulate a loading and unloading crane supporting the crankshaft and rolling on an overhead rail of a character shown in Patent 1,700,721. Thus this arrangement not only eliminates all former costly loading and unloading devices but also greatly facilitates the handling of the crankshaft W into and out of the lathe. Furthermore with an arrangement of this type it is unnecessary to raise or lower the crankshaft in a vertical plane thus further eliminating effort and fatigue on the part of the operator.

It is to be further noted that the use of the prepared notches 43 and 44 are not limited in their use to effect only efficient loading or unloading of work in the lathe but are also used in greatly increasing the efficiency of machining processes to be performed in this lathe and in subsequent machining operations. In this lathe these notches are utilized for accurately supporting the crankshaft W in the center drive chucks and provide means for positively driving the crankshaft during the cutting operation. Furthermore the notches 43 in the webs adjacent the flange end line bearing 27 and stub end line bearing 29 are utilized for indexing the crankshaft in chucking devices of a character shown in Patent 2,030,142, dated February 11, 1936, used in orbital lathes of a character shown in Patent 1,934,530, dated November 7, 1933. These notches may also be utilized in machines of a character shown in application Serial Number 80,204, filed May 16, 1936, for subsequent finish machining operations on the line bearings, flange, and stub ends of the crankshaft and are also used in grinding the crank pins of the crankshafts. Thus the applicants have utilized the notches not only to facilitate chucking of the crankshaft but also to greatly simplify and improve the method of loading and unloading work in the lathe. Furthermore these notches accurately guide the crankshafts into and out of loading position so as to prevent damage to the cutting tools and to also permit said cutting tools to be stopped in retracted position much closer to the axis of the work than was possible in former lathes that were loaded and unloaded manually with the conventional loading devices cited above thus cutting down the loss of time required to traverse the tools to and from cutting position on the work and to thereby greatly increase the productive output of the machine to which this arrangement is applied. This arrangement also reduces the cost of construction of the machine as it permits the use of much smaller diameter center drive gears to accommodate the necessary chucking devices and loading and unloading mechanism than heretofore has been provided.

There are various methods of operating this loading and unloading arrangement. One method would be to at all times have the tailstock 100 and its center 110 fixed and to insert and remove the crankshaft W from the right hand side of the machine. In conjunction with this arrangement either one loading rail 130 or both loading rails 130 and 131 may be utilized in connection with the tailstock 101. When a single rail 130 is used the rough crankshafts W are placed on the rail and loaded into the chuck and the finished crankshafts are slid out on the same rail and removed therefrom. This is a very satisfactory arrangement where the maximum saving in loading and unloading time is off set by the lesser amount of equipment required in this arrangement. Where further savings are desired in the loading and unloading time when loading from one side only of the machine two loading rails 130 and 131 are provided on the tailstock 101 upon one of which is placed the rough crankshafts W and the other to receive finished crankshafts W as they come out of the center drive chucks. Thus in this set up the rough crankshafts can be placed on one rail 131 and finished crankshafts removed from the other rail 130 while the machine is going through its cutting cycle.

Still another way of operating this arrangement is to have both tailstocks 100 and 101 movable and to provide a loading rail for each tailstock. In this instance the rail 130 of the tailstock 100 receives the finished crankshafts while the rough crankshafts are placed on the rail 130. A unique feature in connection with this set up is that the operator may still remain at one side of the machine while loading crankshafts in the lathe, it being unnecessary for him to go to the other side of the machine to unload the finished work. In operation both tailstocks withdraw from work holding position when the cutting cycle has been completed bringing their respective loading rails 130 in alignment with the chucks. The rough crankshaft W, which has previously been placed on the rail 130 for example of tail stock 101, is pushed axially to the left engaging the finished crankshaft lying unchucked in the center drive gears 7 whereby the finished crankshaft is ejected out of the gears and onto the rail 130 of the tailstock 100 as the rough crank shaft is brought into chucking position. The rail 130 on the tailstock 100 may be so constructed that as further crankshafts are passed into, machined, and ejected from the machine the finished crankshafts will automatically drop from this rail onto a suitable conveyor to be carried thereby to subsequent operations to be performed on the crankshafts. Thus with this method of operation the operator need only load rough crankshafts into the chucks and operate the clamping mechanism in the chucks. The number of times the operator must handle the crankshafts per given output of the machine is thus enormously reduced and it is also found that much less effort is required to simultaneously slide two crankshafts in this loading and unloading arrangement than is required to operate a pair of loading devices as shown in Patent 2,069,-107, dated January 26, 1937, because of the ease of sliding provided by the unique arrangement of the notches 43 and 44 on the crankshafts.

The operation and control mechanism for actuating the tailstock with one loading and unloading rail is shown in Figure VI. The control lever 134 for effecting the various sequential operations of the tailstock 100 or 101 has a shaft 135 upon which are mounted suitable actuating cams 136 and 137 for effecting operation of the control valves 138 and 139 as will be described. When the control lever 134 is in the "clamp" position valve 138 is so actuated by the cam 136 that fluid pressure from the pump 55 passes through line 140, the valve 138, through line 141, and into the head end of the cylinder 129 to force its piston 128 and rod 127 against the clamping plate 124 to clamp the barrel 109 in the tailstock 101 when in work engaging position. Drainage from the rod end of the cylinder under these conditions returns through line 142, the valve 138 and into the drain line 61 to the reservoir 58.

After the work W has been machined the control lever is moved from the "clamp" position to the "unclamp" position whereupon valve 138 is delivered to line 142 to retract the piston 128 and rod 127 of the cylinder 129 from the clamping plate 124 to unclamp the barrel 109 from the tailstock 101, drainage from the head end of the cylinder 129 under these conditions returning through line 141, through the valve 138, into the drain line 61.

After having unclamped the tailstock barrel 109 the control lever 134 is then moved to "Load" position whereupon fluid pressure from the line 140 passes through the valve 139, the line 143, freely through the bypass valve 144, through the line 145 into the cylinder 117 to effect withdrawal of the barrel 109 from work engaging position, drainage from the cylinder 117 under these conditions passes through the lines 146, freely through the pressure reducing valve 147, the line 148, freely through the bypass valve 149 into the line 150, and through the valve 139 into the drain 61. After the cylinder 117 has effected complete withdrawal of the barrel 109 and its piston and rod has stalled against a suitable stop, pressure builds up in the lines 143 and 145 causing fluid to bypass through the valve 144, through the line 151 into the head end of the cylinder 105 moving its piston 107 and rod 108 to move the tailstock 101 and its barrel 109 from alignment with the axis of the center drive chucks and to bring the loading and unloading rail 130 into alignment with the center drive chucks. While the piston 107 is being so actuated fluid is being discharged from the cylinder 105 through the line 152, freely through the valve 149, through the line 150, the valve 139, and into the drain line 61.

After the piston 107 has completed this movement the machine is then in condition to unload the finished work piece and load a rough piece preparatory to beginning another cutting cycle.

When the rough work piece W has been loaded in the center drive chucks the control lever is moved from the "Load" position to the "Normal" position whereupon fluid pressure from the line 140 passes through the line 150, freely through the valve 149, through the line 152 into the rod end of the cylinder 105 thus moving the tailstock 101 and its barrel 109 into alignment with the axis of the center drive chucks. Under these conditions fluid is expelled from the head end of the cylinder 105 through the line 151, freely passing through the valve 144 into the line 143 and then through the valve 139 into the drain line. As soon as the tailstock 101 has moved to said aligned position the piston 107 stalled by suitable abutment means, pressure builds up in the lines 152 and 150 discharging fluid through the valve 149 into line 148 and through the pressure reducing valve 147 is delivered into line 146 at a predetermined lower pressure for actuating the cylinder 117 to insert the center 110 of the barrel 109 in the tailstock 101 just the right pressure to engage the work without distorting it. Discharge from the cylinder 117 is carried by the line 145, freely through the valve 144, into the line 143 and through the valve 139 into the drain line 61. The work is then clamped in the chucking devices and the control lever 134 moved to "clamp" position to secure the tailstock barrel 109 as described. In cases where both tailstocks 100 and 101 are arranged to move, one of the tailstocks would be moved to work engaging position and its barrel clamped with its center engaging the work to properly axially position said work in the lathe by providing means for accurately stopping the position of the barrel 109 of this tailstock 100 before it is clamped. The tailstock 101 is then brought to work engaging position as described.

In instances where an unloading rail 130 and a loading rail 131 are utilized in conjunction with the tailstock 101 an operating circuit as shown in Figure V is utilized. The method of clamping and unclamping the tailstock barrel 109 is the same as described in Figure VI. The control lever 134 is provided with an "Unload" position as well as a "Load" position as in Figure VI. When in the "Unload" position the unloading rail 130 is aligned with the center drive chucks and when in the "Load" position the rail 131 is aligned with the chucks. When the control lever 134 is in the "Unload" position fluid pressure from the line 140 passes through the valve assembly 153 into the line 143, passing freely through the valve 144 into the line 145 connected to the cylinder 117 to retract the barrel 109 from work engaging position at the completion of which movement fluid is bypassed through line 151 into the head end of the cylinder 105 moving its piston 107 and rod 108 to retract the tailstock from aligned position to the uploading position. During this movement fluid is discharged from the rod end of the cylinder 105 through the line 152, the valve 149, line 150, and the valve assembly 153 into the drain line 61 and also through the line 154 connected to an annular groove 155 formed midway the length of the bore of the cylinder 105 and connected through the valve assembly 153 with the drain line 61. The piston 107 continues to move past this annular groove 155 until it is exposed to connection with the head and chamber of the cylinder at which time pressure from the line 151 can escape through the line 154 thus allowing the piston to come to a stop to thus bring the unloading rail 130 in alignment with the center drive chucks.

When the control lever 134 is moved to "Load" position the valve assembly 153 is actuated to close off the line 154 to again build up pressure in the head end chamber of the cylinder 105 received from the line 151 to cause the piston 107 to complete its stroke to bring the loading rail 131 in aligned position with said chucks.

After the work has been appropriately loaded in the machine the control lever is moved to the "Normal" position whereupon fluid pressure is delivered to the cylinders 105 and 117 and fluid exhausted therefrom in a manner as described in Figure VI, the line 154 being closed off and ineffective during this operation.

Having thus fully set forth and described our invention what we claim and desire to secure by United States Letters Patent is:

1. In a lathe, one or more rotatable center drive chucks, means for rotating said chucks, means for stopping said chucks, cutting tools associated with said chucks, tailstocks associated with said chucks, having centers and loading and unloading rails incorporated therein, and means for moving said tailstocks relative to said chucks for alternately presenting said centers and said rails in alignment with said chucks.

2. In a lathe, one or more rotatable center drive chucks, means for rotating said chucks, means for stopping said chucks in a definite predetermined position, cutting tools associated with said chucks, tailstocks associated with said chucks having centers and loading and unloading rails incorporated therein, and means for moving said tailstocks relative to said chucks for presenting said centers in alignment with said chucks when said cutting tools are operating on a work piece in the chucks and for presenting said loading and unloading rails in alignment with the chucks when said chucks are stopped for loading and unloading work from said chucks.

3. In a lathe, a rotatable center drive chuck, means for rotating said chuck, means for stopping said chuck in a predetermined position, a tailstock associated with said chuck, a center and a loading and unloading rail incorporated in said tailstock, means for moving said tailstock relative to the axis of rotation of said chuck for alternately bringing said center or said rail in alignment with said chuck.

4. In a lathe, a rotatable center drive chuck, means for rotating said chuck, means for stopping rotation of said chuck in a predetermined position, a tailstock associated with said chuck, a center, a loading rail, and an unloading rail incorporated in said tailstock, means for moving said tailstock relative to the axis of rotation of said chuck for bringing either of said rails or said center in alignment with said chuck.

5. In a lathe, a rotatable center drive chuck, means for rotating said chuck, means for stopping said chuck in a predetermined position, a tailstock each side of said chuck, a center and a loading rail incorporated in each of said tailstocks, means for moving said tailstocks relative to the axis of rotation of said chuck for alternately bringing said centers or said rails in alignment with said chuck.

6. In a lathe, a rotatable center drive chuck, means for rotating said chuck, means for stopping said chuck in a predetermined position, a tailstock each side of said chuck, a loading and unloading rail associated with one of said tailstocks, and means for moving said last mentioned tailstock relative to the axis of rotation of said chuck for alternately bringing its center or its rail in alignment with said chuck.

7. In a lathe, a rotatable center drive chuck, means for rotating said chuck, means for stopping said chuck in a predetermined position, a tailstock each side of said chuck, a loading rail, an unloading rail, and a center associated with one of said tailstocks, and means for moving said last mentioned tailstock relative to the axis of rotation of said chuck for alternately bringing either of its rails or said center in alignment with said chuck.

8. In a lathe, a rotatable center drive chuck, means for rotating said chuck, means for stopping said chuck in a predetermined position, fixed locating surfaces in said chuck adapted to engage locating surfaces on a work piece to be machined in said lathe, a tailstock associated with said chuck, a center in said tailstock, a loading and unloading rail mounted on said tailstock, and means for moving said tailstock relative to said chuck for bringing said center in engagement with the end of said work piece in the chuck or bringing said rail in alignment with the locating surfaces in said chuck when stopped in said predetermined position.

9. In a lathe, a rotatable center drive chuck, means for rotating said chuck, means for stopping said chuck in a predetermined position, fixed locating surfaces in said chuck adapted to engage locating surfaces on a work piece to be machined in said lathe, tool feeding devices associated with said chuck, surfaces on said tool feeding devices adapted to be aligned with said surfaces in said chuck when said chuck is stopped and said tool feeding devices are withdrawn from said work piece, said surfaces thus forming a substantially continuous rail through said chuck and past said tool feeding devices upon which may be axially slid said work piece on its locating surfaces into or out of said chucking device.

10. In a lathe, a rotatable center drive chuck, means for rotating said chuck, means for stopping said chuck in a predetermined position, fixed locating surfaces in said chuck adapted to engage locating surfaces on a work piece to be machined in said lathe, tool feeding devices associated with said chuck, surfaces on said tool feeding devices adapted to be aligned with said surfaces in said chuck when said chuck is stopped and said tool feeding devices are withdrawn from said work piece, tailstocks associated with said chuck and tool feeding devices, a center and a loading and unloading rail associated with said tailstocks, and means for moving said tailstocks so as to bring said rails in alignment with said surfaces of the chuck and tool feeding devices to form a substantially continuous rail through said chuck and past said tool feeding devices and tailstocks upon which may be axially slid said work piece on its locating surfaces into and out of said chucking devices.

11. In a lathe, a rotatable center drive chuck, means for rotating said chuck, means for stopping said chuck in a predetermined position, fixed locating surfaces in said chuck adapted to engage locating surfaces on a work piece to be machined in said lathe, tailstocks associated with said chuck, surfaces on said tailstocks adapted to be aligned with said surfaces in said chuck when said chuck is stopped and the centers of said tailstocks are removed from said work piece, said surfaces thus forming a substantially continuous rail through said chuck and past said tailstocks upon which may be axially slid said work piece on its locating surfaces into or out of said chucking device.

12. In a lathe, a rotatable center drive chuck, means for rotating said chuck, means for stopping said chuck in a predetermined position, fixed locating surfaces in said chuck adapted to engage locating surfaces on a work piece to be machined in said lathe, tool slides operable each side of said chuck, cutting tools mounted on said slides, guide blocks mounted on said slides having surfaces adapted to be aligned with said surfaces in said chuck when said tools are retracted from said work piece and said chucks are stopped and means for adjusting said blocks relative to said tool slides.

13. In a lathe, a pair of rotatable center drive chucks, means for rotating said chucks in synchronism, means for stopping said chucks in a predetermined position, fixed locating surfaces in said chucks adapted to engage locating surfaces on a work piece to be machined in said lathe, tool slides operable each side of and between said chucks, cutting tools mounted on said slides, and guide blocks mounted on said slides having surfaces adapted to be aligned with said surfaces in said chucks when said tools are retracted from said work piece and said chucks are stopped to thus form a substantially continuous rail for accurately guiding said work pieces into or out of said chucks and past said cutting tools.

14. In a lathe a tailstock movable relative to the spindle axis of said lathe, an axially movable center in said tailstock, means for clamping said center against axial movement when engaged with a work piece in said lathe, a loading and unloading rail mounted on said tailstock, means for axially withdrawing said center from said work piece, and means for moving said tailstock to remove said center from aligned position with said spindle axis and to bring said rail in alignment therewith to facilitate loading or unloading said work piece on said axis.

15. In a lathe, a tailstock, fluid pressure means for moving said tailstock perpendicular to the spindle axis of said lathe, fluid pressure means for axially reciprocating the tailstock center, fluid pressure means for clamping said center when in work engaging position, and hydraulic control means for operating said fluid pressure means in a predetermined sequential relationship.

16. In a lathe, a tailstock, fluid pressure means for moving said tailstock perpendicular to the spindle axis of said lathe, fluid pressure means for axially reciprocating the tailstock center, fluid pressure means for clamping said center when in work engaging position, hydraulic control means for rendering said fluid pressure means operative in predetermined sequence so that the center may be unclamped and withdrawn from the work and then the tailstock moved to withdraw the center from alignment with the work spindle axis of said lathe.

17. In a lathe, a tailstock, fluid pressure means for moving said tailstock perpendicular to the spindle axis of said lathe, fluid pressure means for axially reciprocating the tailstock center, fluid pressure means for clamping said center when in work engaging position, hydraulic control means for rendering said fluid pressure means operative in predetermined sequence so that the center may be unclamped and withdrawn from the work and then the tailstock moved to withdraw the center from alignment with the work spindle axis of said lathe, and to move said tailstock to a predetermined accurate position relative to said axis.

18. In a lathe, a tailstock, fluid pressure means for moving said tailstock perpendicular to the spindle axis of said lathe, fluid pressure means for axially reciprocating the tailstock center, fluid pressure means for clamping said center when in work engaging position, hydraulic control means for rendering said fluid pressure means operative in predetermined sequence so that the center may be unclamped and withdrawn from the work and then the tailstock moved to withdraw the center from alignment with the work spindle axis of said lathe, and to move said tailstock to a plurality of predetermined accurate positions relative to said axis.

19. In a device for loading and unloading rough, irregular work pieces in a machine tool, a loading and unloading rail associated with a chucking device of said machine tool adapted to engage locating surfaces premachined on said work pieces to be machined so that said work pieces may be slid axially on said surfaces on said loading and unloading rail into or out of said chucking device, means for positioning said chucking device in a predetermined position relative to said rail and means in said chucking device for gripping said work pieces by means of said surfaces.

20. In a device for loading and unloading rough, irregular work pieces in a center drive lathe, a loading and unloading rail associated with a chucking device of said lathe adapted to engage locating surfaces premachined on said work pieces to be machined so that said work piece may be moved axially on said surfaces on said loading and unloading rail into or out of the center drive chucking device of said lathe, means for positioning said chucking device in a predetermined position relative to said rail, and means in said chucking device for gripping said work pieces by means of said surfaces.

21. In a device for loading and unloading rough, irregular work pieces in a center drive lathe, a loading rail associated with a center drive chucking device of said lathe adapted to engage locating surfaces premachined on said work pieces to be machined so that said work pieces may be moved axially on said surfaces on said loading rail into the center drive chucking device, means for positioning said chucking device in a predetermined position relative to said rail, means in said chucking device for gripping said work pieces by means of said surfaces, an unloading rail associated with said chucking device adapted to engage said locating surfaces on the work pieces when it is moved out of said chucking device after the completion of said machining.

22. In a device for loading and unloading rough, irregular work pieces in a center drive lathe, a loading rail located to one side of a center drive chucking device of said lathe adapted to engage locating surfaces premachined on said work pieces to be machined so that said work pieces may be moved axially on said surfaces on said loading rail into said center drive chucking device, means for positioning said chucking device in a predetermined position relative to said rail, means in said chucking device for gripping said work pieces by means of said surfaces, and an unloading rail located on the other side of said chucking device adapted to engage said locating surfaces on the work pieces when it is moved out of said chucking device after the completion of said machining.

23. In a loading and unloading mechanism for a center drive crankshaft lathe, a loading rail associated with a center drive chucking device of said lathe adapted to engage locating surfaces premachined on webs of a crankshaft to be machined so that said crankshaft may be moved axially on said surfaces on said loading rail into the center drive chucking device, means for positioning said chucking device in a predetermined position relative to said rail, means in said chucking device for gripping said crankshaft by means of said surfaces, and an unloading rail associated with said chucking device adapted to engage said locating surfaces of the crankshaft when it is moved out of said chucking device after the completion of said machining.

24. In a loading and unloading mechanism for a center drive crankshaft lathe, a loading rail located to one side of a center drive chucking device of said lathe adapted to engage locating surfaces premachined on webs of a crankshaft to be machined so that said crankshaft may be moved axially on said surfaces on said loading rail into the center drive chucking device, means for positioning said chucking device in a predetermined position relative to said rail, means in said chucking device for gripping said crankshaft by means of said surfaces, and an unloading rail located at the other side of said chucking device adapted to engage said locating surfaces on the crankshaft when it is moved out of said chucking device after the completion of said machining.

25. In a loading and unloading mechanism for a center drive crankshaft lathe, a loading rail arranged to be positioned in alignment with the center drive chuck of said lathe adapted to engage locating surfaces premachined on webs of a crankshaft to be machined so that said crankshaft may be moved axially on said surfaces on said loading rail into said chuck, means for positioning said chucking device in a predetermined position relative to said rail, means in said chucking device for gripping said crankshaft by means of said surfaces, and an unloading rail arranged to be positioned in alignment with the center drive chuck to engage said locating surfaces on the crankshaft when it is moved out of said chucking device after the completion of said machining.

26. In a loading and unloading mechanism for a center drive crankshaft lathe, means for positioning a loading rail in alignment with a chucking device of said lathe, said rail being adapted to slidably support a crankshaft having premachined locating surfaces thereon and adapted to be placed on said rail on said surfaces and moved into said chucking device, means in said chucking device for gripping said crankshaft by means of said surfaces, and means for positioning an unloading rail in alignment with said chucking device to receive said crankshaft when machined as it is ejected from said chucking device by moving further unmachined crankshafts from said loading rail into said chucking device.

27. In a loading and unloading mechanism for a center drive lathe, a center drive chuck having means adapted to grip a crankshaft by means of locating surfaces in predetermined position thereon, means for positioning said chuck in predetermined position of rotation, means on one side of and aligned with said gripping means on said chuck when the latter is in said position, for guiding an unworked crankshaft into said chuck by means of said locating surfaces, and means on the other side of, and aligned with said gripping means on said chuck when in said position, to receive a worked crankshaft as it is moved from said chuck, under guidance of said surfaces, by the movement of an unworked crankshaft into said chuck.

28. In a loading and unloading mechanism for a center drive crankshaft lathe, a center drive chuck having means adapted to grip crankshafts by means of premachined locating surfaces thereon, and work supporting means each side of said chuck and aligned with said gripping means of said chuck adapted to permit sliding of unmachined crankshafts axially of said chuck to engage finished crankshafts gripped in said chuck, said means permitting continued axial movement of said unfinished crankshafts to thereby simultaneously eject said finished crankshafts as said unfinished crankshafts are brought into said chuck.

29. In a lathe, a tailstock movable relative to the spindle axis of said lathe, an axially movable center in said tailstock, means for clamping said center against axial movement when engaged with a work piece in said lathe, a loading and unloading rail connected to said tailstock, means for axially withdrawing said center from said work piece, and means for moving said tailstock to remove said center from aligned position with said spindle axis and to bring said rail in alignment therewith to facilitate loading or unloading said work piece on said axis.

30. In a lathe, a tailstock movable relative to the spindle axis of said lathe, an axially movable center in said tailstock, means for clamping said center against axial movement when engaged with a work piece in said lathe, a loading and unloading rail associated with said tailstock, means for axially withdrawing said center from said work piece, and means for moving said tailstock to remove said center from aligned position with said spindle axis and to bring said rail in alignment therewith to facilitate loading or unloading said work piece on said axis.

31. In the lathe, a bed, a tailstock having an axially movable center and mounted on said bed for motion transverse to the axis of said center, fluid pressure operating means for so moving said tailstock, a binder for said center, fluid pressure actuating means for said binder, fluid pressure power means for axially moving said center, a control member for said power means and said operating means, and connections including a manually-controlled element for actuating said power means, said actuating means and said operating means, to release said binder and to retract said center and move said tailstock on continued motion of said element in center releasing direction, after release has been effected, and to return said tailstock, advance said center and then lock it on movement of said actuating means to its initial position.

32. In a lathe, a bed, a tailstock having an axially movable center and mounted on said bed for motion transverse to the axis of said center, fluid pressure operating means for so moving said tailstock, a binder for said center, fluid pressure actuating means for said binder, a handle having a plurality of operative positions, fluid pressure power means for axially moving said center, control means for said power means, said operating means and said actuating means, and connections between said handle and said control means for actuating said control means to cause said power means to retract said center and move said tailstock when said handle is moved from a first position through a second position to a third position and to return said tailstock and present said center to the work when said handle is moved from said third position to said first position, and to effect operation of said actuating means for operating said binder to clamp and unclamp said center when said handle is moved from said first position to said second position.

33. In a lathe, a bed, a tailstock having an axially movable center and mounted on said bed for motion transverse to the axis of said center, fluid pressure operating means for so moving said tailstock, a binder for said center, fluid pressure actuating means for said binder including a handle having a plurality of operative positions, fluid pressure power means for moving said center, a control member for said power means and said operating means, and connections between said actuating means and said control member for actuating said power means to retract said center and said operating means to withdraw said tailstock when said handle is moved from a first position through a second position to a third position and to return said tailstock and present said center to the work when said handle is moved from said third position to said first position, and to effect clamping and unclamping of said center when said handle is moved from said first position to said second position.

34. In a lathe, means for receiving and rotating a workpiece, a tailstock and a center in the tailstock, a plurality of parallelly arranged rails secured to the tailstock for receiving workpieces, and means for moving said tailstock transversely of the lathe to permit one of said rails to come into alignment with the axis of rotation of the lathe in order to receive said workpiece from the lathe while holding another workpiece in a second rail in readiness to be moved further with the tailstock into line with said axis of rotation and preparatory to locating the second workpiece in machining position in the lathe when the first workpiece has been removed therefrom.

35. In a lathe, a bed, a tailstock movable transversely of the bed and carrying an axially movable center, a binder for said center, first fluid pressure means for operating said binder, second fluid pressure means for moving said tailstock, and third fluid pressure means for moving said center, a control element for said first, second and third means, adapted to be moved to a plurality of positions, said element in one position being adapted to operate said first means to cause the binder to be released, and then to operate said second and third means to retract said center and move the tailstock from the axis of rotation of the lathe on continued motion of said element after a release has been effected, and on further movement of said element to operate said second and third means to move the tailstock into the axis of rotation of the lathe and to cause the center to contact the workpiece, and on still further movement of the element, to operate said first means to clamp the binder about the center.

WILLIAM F. GROENE.
WALTER R. MEYER.